United States Patent [19]

Innes

[11] Patent Number: 5,520,798

[45] Date of Patent: May 28, 1996

[54] PROCESS FOR REFORMING HYDROCARBON FEEDSTOCKS OVER A SULFUR SENSITIVE CATALYST

[75] Inventor: Robert A. Innes, San Rafael, Calif.

[73] Assignee: Chevron Chemical Company, San Ramon, Calif.

[21] Appl. No.: 264,439

[22] Filed: Jun. 23, 1994

[51] Int. Cl.⁶ .......................... C10G 35/09; C10G 35/095
[52] U.S. Cl. ........................... 208/140; 208/141; 208/213
[58] Field of Search ................................. 208/140, 141, 208/138, 213

[56] References Cited

U.S. PATENT DOCUMENTS 4,018,711  4/1977  Bertolacini .......................... 252/455 Z
4,746,764  5/1988  Lambert et al. .......................... 585/419
5,270,272  12/1993  Galperin et al. .......................... 502/37

*Primary Examiner*—Asok Pal
*Assistant Examiner*—Bekir L. Yildirim
*Attorney, Agent, or Firm*—Burns, Doane, Swecker & Mathis

[57] ABSTRACT

Provided is a process for catalytically reforming a hydrocarbon feedstock using a highly sulfur sensitive catalyst. The process comprises contacting the hydrocarbon in a reaction zone, with the hydrocarbon feed and catalyst flowing in opposite directions. Once the catalyst has passed through the reaction zone, it is then passed to a regeneration zone for regeneration. The process eliminates the need of passing the hydrocarbon feed through a sulfur sorber prior to entry into the reaction zone, as the spent catalyst which is leaving the reaction zone for regeneration acts as a sulfur sorber and removes the sulfur from the feed entering the reaction zone.

23 Claims, 2 Drawing Sheets

PROCESS FOR REFORMING HYDROCARBON FEEDSTOCKS OVER A SULFUR SENSITIVE CATALYST

BACKGROUND OF THE INVENTION

The present invention relates to a multi-stage process for reforming hydrocarbon feedstocks boiling in the gasoline range. The process can be used to make hydrogen, high octane steams for gasoline blending, and benzene, toluene, and/or xylene rich streams for petrochemical use. In particular, the present invention relates to a reforming process wherein the reforming catalyst is highly sulfur sensitive.

The reforming process embraces a number of reactions such as dehydrocyclization, hydrodecyclization, isomerization, hydrogenation, dehydrogenation, hydrocracking, cracking, etc. The desired outcome is the conversion of paraffins, naphthenes, and olefins to aromatics and hydrogen. Usually, the reaction is carried out by mixing a hydrotreated hydrocarbon feedstock with recycle hydrogen and passing the mixture over a reforming catalyst at a temperature of 800°–1050° F. and a pressure of 0–600 psig.

There have recently been developed highly active and selective reforming catalysts comprising a noble metal such as platinum on a zeolite support. These catalysts are particularly effective for the conversion of $C_6$–$C_8$ paraffins to aromatics such as benzene, toluene, and xylenes which may be recovered by extraction for subsequent use in the petrochemical industry. Some of these zeolite catalysts, however, while highly selective, are rapidly poisoned by sulfur.

Nonacidic Pt-L zeolites are a prime example of such sulfur sensitive catalysts. Examples of Pt-K-L zeolite catalysts are described in U.S. Pat. No. 4,104,320 (Bernard et al.), U.S. Pat. No. 4,544,539 (Wortel), and U.S. Pat. No. 4,987,109 (Kao et al.). Pt-Ba,K-L zeolite catalysts are described in U.S. Pat. No. 4,517,306 (Buss et al.). It is disclosed in U.S. Pat. No. 4,456,527 that such catalysts are able to achieve satisfactory run lengths only when the sulfur content of the feed is substantially reduced, for example, preferably to less than 100 parts per billion by weight (ppbw), and more preferably to less than 50 ppbw. The lower the sulfur content of the feed the longer will be the run length.

The patent literature provides several methods that have been specifically identified as suitable for regenerating a highly sulfur sensitive zeolite reforming catalyst that has been contaminated by sulfur. For example, see U.S. Pat. No. Re. 34,250 issued to Van Leirsburg et al. See also European patent disclosure 316,727, which involves pretreating deactivated Pt-L-zeolite catalysts at 500° C. with a halogen compound, such as carbon tetrachloride, and nitrogen. Continuous catalyst regeneration using the technology described, for example, in the report "Continuous reformer catalyst regeneration technology improved" by Roger L. Peer, et al., *Oil & Gas Journal*, May 30, 1988, is also well known. In the process, the catalyst moves continuously through the regeneration process by gravity, while gas streams steadily flow radially across the catalyst bed. The objective is to provide essentially continuous fresh catalyst performance, thereby giving steady yields. Various other methods for regenerating sulfur contaminated catalysts are also known to those skilled in the art.

Removal of sulfur from the hydrocarbon stream prior to contact with the sulfur sensitive catalyst, however, has received the main focus in maximizing reforming results when using such catalysts. For example, there is provided in the patent literature several ways to obtain ultralow sulfur feedstocks.

U.S. Pat. No. 4,456,527 describes a process wherein the naphtha feed is hydrofined and then passed over a supported CuO sulfur sorbent at 300° F. to produce a feed containing less than 50 parts per billion by weight (ppbw) sulfur.

In U.S. Pat. No. 4,925,549, residual sulfur is removed from a hydrotreated feedstock by reacting the feedstock with hydrogen over a less sulfur sensitive reforming catalyst, converting the residual sulfur compounds to hydrogen sulfide, and absorbing the hydrogen sulfide on a solid sulfur sorbent such as zinc oxide. In U.S. Pat. No. 5,059,304, a similar process is described except that the sulfur sorbent comprises a Group IA or IIA metal oxide on a support. In U.S. Pat. No. 5,211,837, a manganese oxide sulfur sorbent is used.

In U.S. Pat. No. 5,106,484, a hydrotreated feedstock is passed over a massive nickel catalyst and then treated over a metal oxide under conditions which result in a substantially purified naphtha. The metal oxide is preferably manganese oxide and the treatment may be carried out in the presence of recycle hydrogen.

While the sulfur removal techniques of the prior art are effective, they add to the complexity of the reforming process. For example, additional sulfur sorber and recycle-gas sulfur convertor/sorber reactors are necessary, along with their associated catalyst and sorbent materials. In addition, the recycle-gas sulfur convertor/sorber reactors which typically operate under mild reforming conditions may catalyze side reactions causing some yield loss.

Accordingly, any process involving a sulfur sensitive catalyst which can reduce the need for complicated sulfur removal steps would be desirable.

It is therefore an object of the present invention, to provide a novel reforming process which involves a sulfur sensitive catalyst and is relatively simple in its approach to sulfur removal and protection of the sulfur sensitive catalyst used.

Another object of the present invention is to provide an efficient and effective reforming process which involves a sulfur sensitive catalyst.

These and other objects of the present invention will become apparent upon a review of the following specification, the drawing and the claims appended hereto.

SUMMARY OF THE INVENTION

In accordance with the foregoing objectives, the present invention provides a process for catalytically reforming a hydrocarbon feedstock containing at least 20 ppbw sulfur, but generally not more than 500 ppbw sulfur. The process comprises contacting the hydrocarbon feedstock and a sulfur sensitive catalyst in a reaction zone, with the hydrocarbon feed and catalyst flowing in opposite directions through the reaction zone such that the catalyst enters the reaction zone at the end from which the product stream is removed. The contacting is generally done in the presence of hydrogen. Once the catalyst is passed through the reaction zone, it is then passed to a regeneration zone for regeneration. In this process, therefore, the sulfur-contaminated hydrocarbon feed is contacted with spent catalyst, i.e., catalyst that is about to leave the reaction zone and be regenerated, which catalyst acts as a sorbent for sulfur contained in the feed. Fresh, or regenerated catalyst, is therefore always contacted with a relatively sulfur-free reaction stream.

For the purposes of this invention, a reforming catalyst is highly sulfur sensitive if run lengths in a fixed-bed reactor with a substantially sulfur-free feed, i.e., less than 20 ppbw sulfur, are at least twice as long as when the feed contains 100 ppbw sulfur (with the run being made in the absence of a sulfur removal step.)

Among other factors, the present invention is based on the discovery that sulfur deposition generally occurs over a relatively small portion of the catalyst bed when carrying out a reforming process over a highly sulfur sensitive catalyst. Thus, when a feed contains 20–500 ppbw sulfur, sulfur mass transfer from the feed to the catalyst occurs in a narrow zone which moves through the catalyst as each increment of catalyst becomes poisoned. The catalytically active sites are in essence being titrated by sulfur in the feed. Thus, the process of the present invention employs a minor portion of the highly sulfur sensitive reforming catalyst itself as both a reforming catalyst and a sulfur removal agent, but uses only that portion of the catalyst which is already spent and is about to leave the reaction zone for regeneration.

The result is a most efficient and effective reforming process, among the advantages of which is that the need for a recycle gas sulfur converter/sorber such as those described in U.S. Pat. Nos. 4,925,549, 5,059,304, 5,211,837, and 5,105,484 is eliminated. Thereby, the process of the present invention provides a simplified reforming process and, in some cases, improved yields of hydrogen and aromatics.

DETAILED DESCRIPTION OF THE PREFERRED EMBODIMENTS

Figure 1:
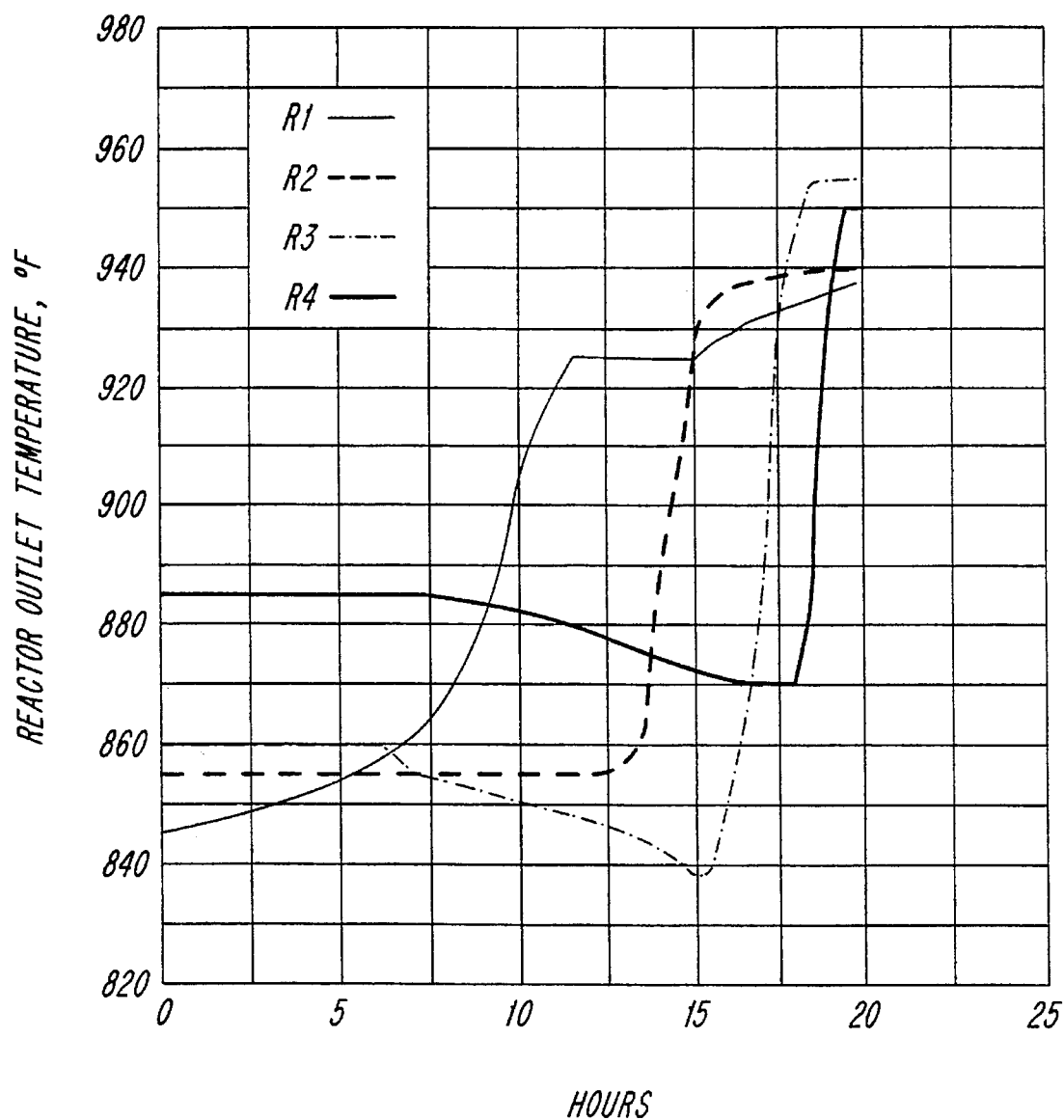
FIG. 1 of the Drawing is a graphical representation of the loss of reactor endotherm and increase in reactor outlet temperature when the catalyst beds in a multi-reactor reforming plant are poisoned by sulfur.

The feedstocks which are suitable for the process of this invention are generally hydrocarbon streams boiling substantially within the gasoline range and containing at least 20 ppbw sulfur, but preferably not more than 500 ppbw sulfur. The process of the present invention is also quite useful for hydrocarbon streams containing at least 50 ppbw sulfur, with the amount of sulfur preferably being in the range of from 50–200 ppbw. This would include streams boiling within the 70° F.–450° F. temperature range, preferably from 120° F. to 400° F. For petrochemical applications $C_6$, $C_6$–$C_7$, $C_6$–$C_8$ streams are especially preferred.

Examples of suitable feedstocks include straight-run naphthas from petroleum refining or fractions thereof which have been hydrotreated to remove sulfur and other catalyst poisons. Also suitable are synthetic naphthas or naphtha fractions derived from other sources such as coal, natural gas liquids, fluid catalytic crackers, and hydrocrackers. Usually, these will also require hydrotreating to bring their sulfur content into the desired range and remove other catalyst poisons.

Other feed pretreatment steps may include passing the feed as a liquid through a sulfur sorber containing, for example, nickel oxide or copper oxide on a support and drying the feed using molecular sieves. A sulfur sorber can also be used as a precaution in case the hydrotreating system fails. Contacting the feed with massive nickel, for example, prior to the reforming reaction would protect against a major failure by the hydrotreating system.

The reforming reaction is carried out in a reaction zone through which the hydrocarbon feedstock and the catalyst flow in opposite directions such that the catalyst is introduced at the end from which the product stream is removed. The reaction zone may consist of one or more reactors. In a preferred embodiment, the reaction zone comprises three to six serially connected reactors. More preferably, the various reactors are stacked, particularly with the catalyst moving down through the reactor train and with the reactant gases moving upward.

The feed to the reaction zone generally comprises from 20 to 500 ppbw sulfur. The sulfur is absorbed by contact with the catalyst traveling in the opposite direction. The result is that the reactants leaving the first feed contacting reactor of the series generally contains less than 20 ppbw sulfur, more preferably less than 5 ppbw sulfur, and most preferably less than 1 ppbw sulfur. The product stream recovered will accordingly be substantially free of sulfur, and contain less than 20 ppbw sulfur, more generally less than 5 ppbw sulfur and most preferably less than 1 ppbw sulfur.

Since the reforming process is endothermic, the feed is reheated between reactors. The reactor employed in this process may be any conventional type of moving bed reactor which can accommodate a continuous flow of hydrocarbon feed and catalyst. All the reactors can be the same or different, with radial flow reactors being preferred. In a preferred embodiment, however, all of the reactors are radial flow reactors except the last reactor in the catalyst flow direction, which reactor employs traditional counter current contact between the catalyst and feedstock.

In general, the reforming reaction can be carried out using any conventional reforming conditions, but is preferably carried out at temperatures ranging from 600° to 1100° F., and more preferably, temperatures in the range of from 800° to 1050° F. Reaction pressures may range from atmospheric pressure to 600 psig, but are preferably from 40 to 100 psig. The molar ratio of hydrogen to hydrocarbon feed is normally between 0.5 and 10, with the preferred range being from 2.0 to 5.0. Hydrocarbon feed weight hourly space velocity is from 0.5 to 20, and more preferably from 0.50 to 5.0 based on the catalyst in the reaction zone.

Another important aspect of the present invention is that the reaction zone is equipped for continuous catalyst regeneration. The catalyst can be regenerated in accordance with any known continuous regeneration procedure for sulfur sensitive catalysts.

For example, in U.S. Pat. No. Re. 34,250, issued to Van Leirsburg et al., which is hereby expressly incorporated by reference, the regeneration process is comprised of a carbon removal step, a platinum agglomeration and sulfur removal step, and a platinum redistribution step. In European patent disclosure 316,727, which is also hereby expressly incorporated by reference, deactivated Pt-L-zeolite catalysts are pretreated at 500° C. with a halogen compound such as carbon tetrachloride and nitrogen. Oxygen is then added to the mixture to remove coke and, finally, the catalyst is treated with a chlorofluorocarbon compound, oxygen, and nitrogen. The continuous catalyst regeneration system as described in the report by Peer et at, *Oil & Gas Journal*, May 30, 1988, which is hereby incorporated by reference, can also be used.

Various other methods for regenerating sulfur contaminated catalysts are known to those skilled in the art. The use of a process which involves sulfur removal and redispersion of platinum, however, is most preferred for regeneration of the catalyst.

It is also part of the preferred embodiment, that the reactor dimensions and catalyst circulation rate be chosen so that the catalyst is regenerated from once a day to once a month, with regeneration every 5 to 14 days being preferred. It is also preferred that the aromatics yield and sulfur concentration profile for the reaction zone remain constant.

The reforming catalysts used in the process of this invention are highly sulfur sensitive. Such highly sulfur sensitive catalysts are well known in the industry, for example, as described in U.S. Pat. Nos. 4,456,527 and 4,925,549, the disclosures of which are hereby expressly incorporated by reference.

The sulfur sensitivity of a catalyst can be determined by carrying out two reforming runs in a fixed-bed microreactor under identical conditions. The first run should be made with a substantially sulfur-free hydrocarbon feedstock containing less than 5 ppbw sulfur, while the second run should be made with the same feed, but with thiophene added to the feed to raise its sulfur content to 100 ppbw. A substantially sulfur-free feed can be obtained by first hydrotreating the feed to bring its sulfur content below 100 ppbw and then using a sulfur convertor/sorber as described in U.S. Pat. No. 5,059,304.

Run length may be defined by allowing either a fixed temperature increase at constant aromatics yield or a given drop in conversion at constant temperature. If the run length in the presence of 100 ppbw feed sulfur is less than half that obtained with substantially sulfur-free feed, then the catalyst is said to be highly sulfur sensitive.

In order to provide a more quantitative measure of sulfur sensitivity, we define herein a test which can be used to determine a Sulfur Sensitivity Index or SSI. The test is carried out by comparing run lengths obtained with a sulfur-free feed and the same feed containing thiophene. The base feed is n-hexane which contains less than 20 ppbw sulfur. In the sulfur-free case a sulfur convertor/sorber is used, while in the sulfur-added case enough thiophene is added to raise the feed sulfur content to 100 ppbw.

In each run, one gram of catalyst is charged to a 3/16" I.D. tubular microreactor. Sulfur-free reactors are used for each run. The catalyst is dried by heating to 500° F. at a rate of 50° F./h, while flowing nitrogen through the reactor at 50 psig and a rate of 500 cc/min. The catalyst is reduced at 500° F. and 50 psig with hydrogen flowing at 500 cc/min. The temperature is then raised to 900° F. at rate of 50° F./h while continuing to flow hydrogen.

The temperature is then lowered to about 850° F. and the reaction started. The reaction is carried out at 5.0 WHSV, 50 psig, and a hydrogen to hydrocarbon feed molar ratio of 5.0. The n-hexane free reservoir is blanketed with dry nitrogen to prevent contamination by water and oxygen and the hydrogen is also dried so that reactor effluent contains less than 30 ppm water.

The reactor effluent is analyzed by gas chromatography at least once an hour and the reaction temperature is adjusted to maintain a 50 wt % aromatics yield on feed. The runs are ended when the reaction temperature has been increased 25° F. from the extrapolated start of temperature.

The Sulfur Sensitivity Index is then calculated by dividing the run length obtained in the sulfur-free case by the run-length obtained in the sulfur-added case. In the process of this invention, it is preferred that the reforming catalysts have an SSI of at least 2.0. It is especially preferred that their SSI exceed 5.0, and it is most preferred that the SSI exceed 10.

A preferred form of highly sulfur sensitive catalyst is comprised of 0.05 to 5.0 wt % noble metal on a zeolite support. The zeolite may be mixed with an inorganic oxide binder such as alumina or silica and formed into spherical or cylindrical pieces of catalyst 1/4" to 1/32" in diameter. The noble metals are preferably platinum or palladium, but some catalysts may contain in addition other noble metals as promoters, such as iridium and rhenium, which act to enhance selectivity or run length. The catalyst may also comprise non-noble metals such as nickel, iron, cobalt, tin, manganese, zinc, chromium, etc.

It is preferred that the zeolite support be substantially nonacidic. Zeolites having pore dimensions in excess of 6.5 Å are especially preferred. Catalysts comprising a large-pore zeolite with nonintersecting channels such as zeolites L and omega are specially sulfur sensitive and benefit most from the process of this invention.

One way to determine whether a catalyst is substantially nonacidic is to immerse 1.0 gram of catalyst in 10 grams of distilled water and measure the pH of the supernatant liquid. A substantially nonacidic zeolite will have a pH of at least 8.0.

Catalysts comprising platinum on substantially nonacidic forms of zeolite L are especially preferred for the process of this invention. Such catalysts are described in U.S. Pat. Nos. 4,104,539, 4,517,306, 4,544,539, and 4,456,527, the disclosure of which are expressly incorporated herein by reference.

The present invention, therefore, provides one with an efficient and effective method for removing sulfur during the reforming of a hydrocarbon feedstock while using a sulfur sensitive catalyst. The process uses a portion of the catalyst for the purpose of removing sulfur. The portion used is the spent catalyst about to exit the reaction zone. By utilizing a flow of the hydrocarbon feed reaction stream and the catalyst in opposite directions, the sulfur contaminated feed always contacts spent catalyst, and fresh or regenerated catalyst always contacts purified feed. The catalyst that becomes contaminated with the sulfur immediately leaves the reaction zone and is passed to regeneration. Therefore, the catalyst in the reaction zone performs the dual function of sulfur removal and selective reforming, with the catalyst about to leave the reaction zone removing the sulfur and beginning the selective reforming reaction. There is no need, therefore, for an additional sulfur sorber.

The process of the present invention will be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLE 1

A sour-gas was injected into the hydrogen recycle system of a four-reactor reforming plant employing a nonacidic Pt-L-zeolite catalyst. The reactors were of a down-flow, fixed-bed, type, and were in series. The catalyst was protected by a sulfur sorber. Eventually, the capacity of the sorber was exhausted and hydrogen sulfide began to breakthrough. There was then a sequential poisoning of the catalyst in each subsequent reactor.

A loss of catalytic activity was indicated by a loss of reactor endotherm and an increase in reactor outlet temperature as shown in FIG. 1. The second, third and fourth reactors in the series did not begin to experience a loss of endotherm until the preceding reactor was totally deactivated. The plant was shutdown just after the catalyst in the last reactor had died. The sulfur content of catalyst samples taken after the incident ranged from 249 ppm in the first reactor to 149 ppm in the last reactor.

These observations show that sulfur adsorption of a nonacidic Pt-L-zeolite catalyst is very rapid and occurs over a very narrow band of catalyst. The data also show that sulfur adsorption was 100% effective until the sulfur loading on the catalyst exceeded 100 ppm.

EXAMPLE II

A sample of a catalyst containing 0.64 wt % platinum on barium exchanged L zeolite extrudates was tested as described above to determine its Sulfur Sensitivity Index. The SSI was determined to be 11.

Figure 2:
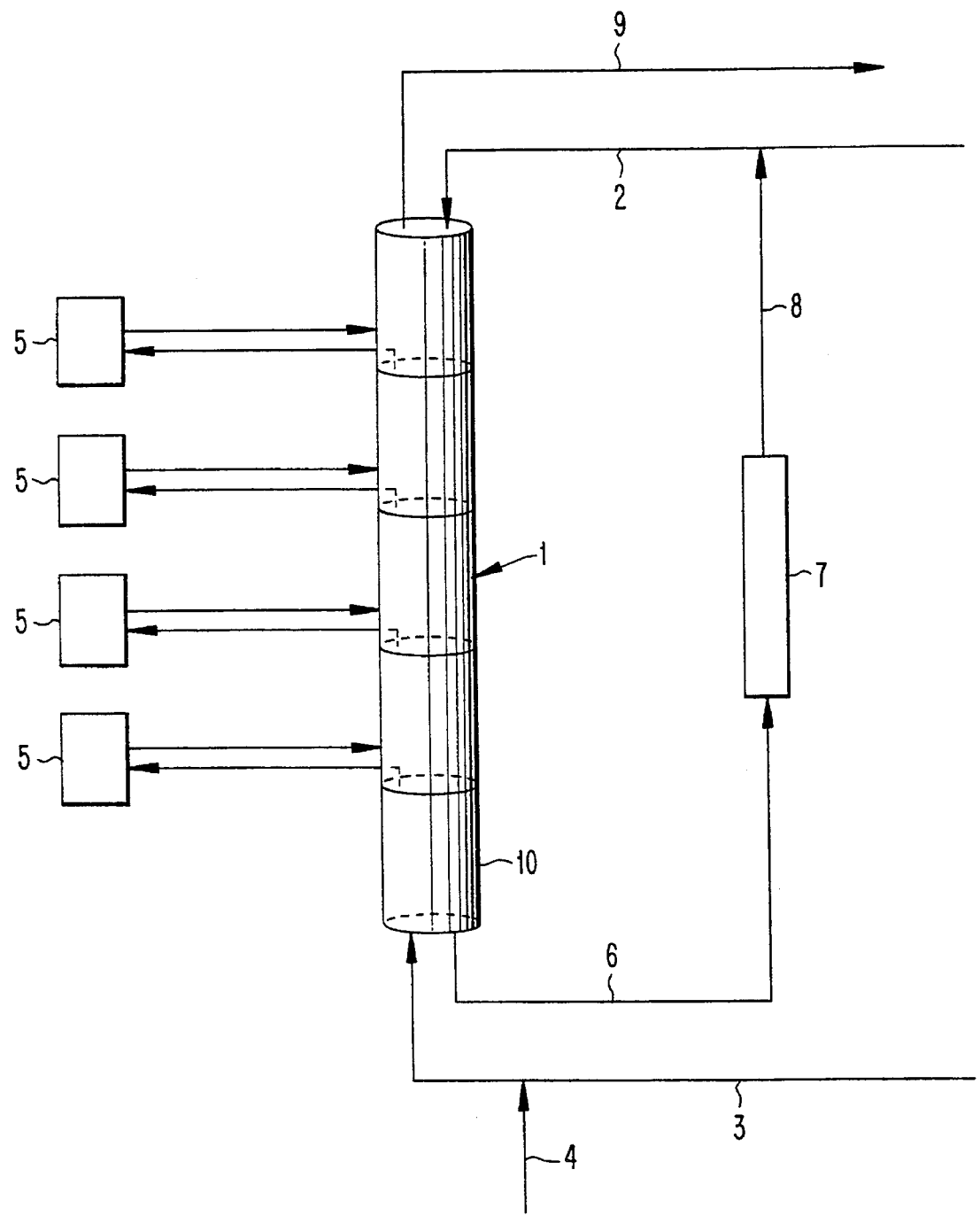
FIG. 2 of the Drawing schematically depicts a reforming process in accordance with the present invention. The process involves a counter-current flow reaction zone which permits the exiting catalyst to act as a sulfur sorbent.

In accordance with the process of the present invention, the foregoing catalyst can be charged to a reforming unit as pictured in FIG. 2. The reforming unit can comprise a number of reactors in the series, with five stacked, reactors 1 being shown in the figure. More or less reactors can be used in the series.

The catalyst is charged via line 2 to the top reactor of the reforming unit, so that the catalyst passes downward, via gravity, through the various reactors of the reforming unit. Preferably, in the bottom reactor 10, the catalyst flow provides conventional counter current contact with the hydrocarbon feedstock. The remaining reactors in the series are all radial flow reactors.

A hydrocarbon feedstock, a $C_6$–$C_7$ naphtha which has been hydrotreated and passed through a sulfur sorber (comprising massive nickel) and a molecular sieve drier, is introduced via line 3 into the bottom of the lower reactor so that the feed passes upwardly through the reforming unit. The sulfur content of the hydrocarbon feed at introduction into the reforming unit is 50 ppbw, and its moisture content is less that 5 ppbw. Hydrogen is mixed with the hydrocarbon feedstock prior to introduction into the reformer zone. The hydrogen is added to the feedstock via line 4. The mixture of feedstock and hydrogen is generally passed through a feed/effluent exchanger and a furnace prior to introduction into the reformer unit, where the feed is heated to reaction temperature.

After start-up, the reforming reaction is carried out with the reactor inlet temperatures at about 920°–960° F. The average reactor pressure drops from 90 to 50 psig as one proceeds through the reactor series. The hydrogen to naphtha feed molar ratio entering the first reactor is generally about 5.0. The naphtha WHSV based on total catalyst volume is 1.0.

The feed stream proceeds through the reactor train. Between each reactor, the stream is removed and heated back to reactor inlet temperature by means of heaters 5. Once heated, the stream is then returned to the next reactor for continued passage upward.

The catalyst moves downward through the series of reactors and exits the last reactor 10 via line 6. The catalyst exiting the reformer unit has been contacted with sulfur contaminated feed, and begins the reforming reaction while also absorbing sulfur. The catalyst then moves via line 6 to the regenerator 7, which processes the catalyst on a continuous basis. In a preferred embodiment, the regenerator comprises a series of radial gas-flow zones. As the catalyst moves through the regeneration vessel 7, it is treated by a series of gas mixtures at elevated temperatures and high velocity to remove sulfur and coke, and to redisperse platinum. Eventually, the catalyst leaves the regenerator via line 8, and returns to the reactors via line 2. The catalyst circulation rate is such that the average catalyst particle is regenerated once every 5 to 14 days.

The feed/reactant stream leaves the last reactor of the series in the feed stream flow direction via line 9 as effluent. This effluent can then be cooled by a feed/effluent exchanger and a trim cooler. The cooled effluent is then passed to a separator, from which a liquid product containing about 80 wt % aromatics is collected out of the bottom. This liquid product can be further purified to collect a higher percentage aromatics stream. A gaseous product is collected out the top of the system and eventually split into net gas and recycle hydrogen streams. The recycle hydrogen is returned via line 4 to the beginning of the process. The net gas is further purified to provide hydrogen for the refinery and to recover additional aromatics.

While the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A process for reforming a hydrocarbon feedstock containing at least 20 ppbw sulfur over a sulfur sensitive catalyst, which comprises:

contacting the hydrocarbon feed with the sulfur sensitive catalyst in a reaction zone, with the hydrocarbon feed and catalyst flowing in opposite directions through the reaction zone; such that the hydrocarbon feedstock containing at least 20 ppbw sulfur initially contacts spent catalyst, which catalyst acts as a sorbent for the sulfur contained in the feed;

removing the spent catalyst from the reaction zone once it has passed through and has contacted the sulfur contaminated hydrocarbon feed and absorbs sulfur therefrom; and passing the removed spent catalyst to a regeneration zone.

2. The process of claim 1, wherein the flow of catalyst through the reaction zone is continuous, and the flow of catalyst to and through the regeneration zone is continuous.

3. The process of claim 2, wherein the catalyst is continuously recycled to the reaction zone from the regeneration zone.

4. The process of claim 1, wherein the catalyst is comprised of an L-zeolite.

5. The process of claim 4, wherein the catalyst further comprises platinum dispersed on the L-zeolite.

6. The process of claim 1, wherein the reaction zone is comprised of from 2 to 6 reactors in series.

7. The process of claim 1, wherein the hydrocarbon feed contains from 20 to 500 ppbw sulfur.

8. The process of claim 1, wherein the hydrocarbon feed is passed through a sulfur sorber prior to the reaction zone.

9. The process of claim 8, wherein the sulfur sorber is comprised of massive nickel.

10. The process of claim 6, wherein the reactors are stacked.

11. The process of claim 10, wherein the hydrocarbon feed flow through the reaction zone is upward and the catalyst flow through the reaction zone is downward.

12. The process of claim 6, wherein the last reactor in the catalyst flow direction employs traditional countercurrent contact between the catalyst and feedstock.

13. The process of claim 6, wherein at least one of the reactors is a radial reactor.

14. The process of claim 12, wherein at least one of the reactors is a radial flow reactor.

15. A process for reforming a hydrocarbon feedstock containing at least 20 ppbw sulfur over a sulfur sensitive catalyst comprised of a Group VIII metal containing L-zeolite, and which comprises:

contacting the hydrocarbon feed with the sulfur sensitive catalyst in a reaction zone, comprised of from 2 to 6 reactors in series, with the hydrocarbon feed and catalyst flowing in opposite directions on a continuous basis through the reaction zone such that the hydrocarbon feedstock containing at least 20 ppbw sulfur initially contacts spent catalyst, which catalyst acts as a sorber for the sulfur contained in the feed;

removing the catalyst from the reaction zone once it has passed through and has contacted the sulfur contaminated hydrocarbon feed and absorbed sulfur therefrom, and passing the removed catalyst to a regeneration zone for regeneration on a continuous basis; and recycling regenerated catalyst to the reaction zone.

16. The process of claim 15, wherein the reactors of the reaction zone are stacked.

17. The process of claim 15, wherein at least one of the reactors is a radial flow reactor.

18. The process of claim 15, wherein the hydrocarbon feedstock is passed through a sulfur sorber prior to the reaction zone.

19. The process of claim 18, wherein the sulfur sorber comprises massive nickel.

20. The process of claim 15, wherein the catalyst is comprised of a platinum containing L-zeolite.

21. The process of claim 15, wherein the last reactor in the catalyst flow direction employs traditional countercurrent contact between the catalyst and feedstock stream.

22. The process of claim 15, wherein a reformed hydrocarbon product stream is recovered from the reaction zone which contains less than 5 ppbw sulfur.

23. The process of claim 15, wherein a reformed hydrocarbon product stream is recovered from the reactor zone which contains less than 1 ppbw sulfur.

* * * * *